(12) United States Patent
Gaither (10) Patent No.: US 7,032,074 B2
(45) Date of Patent: Apr. 18, 2006

(54) METHOD AND MECHANISM TO USE A CACHE TO TRANSLATE FROM A VIRTUAL BUS TO A PHYSICAL BUS

(75) Inventor: Blaine Douglas Gaither, Fort Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 10/814,154

(22) Filed: Apr. 1, 2004

(65) Prior Publication Data

US 2004/0215901 A1    Oct. 28, 2004

Related U.S. Application Data

(63) Continuation of application No. 09/733,123, filed on Dec. 8, 2000, now Pat. No. 6,721,848.

(51) Int. Cl.
*G06F 12/02* (2006.01)

(52) U.S. Cl. .................................. 711/122
(58) Field of Classification Search ............. 711/122
See application file for complete search history.

(56) References Cited

U.S. PATENT DOCUMENTS

| 5,029,070 | A | * | 7/1991 | McCarthy et al. | 711/143 |
| 5,675,763 | A | * | 10/1997 | Mogul | 711/135 |
| 5,713,004 | A | * | 1/1998 | Kimmel et al. | 711/145 |
| 5,778,424 | A | * | 7/1998 | Guy | 711/118 |
| 5,996,048 | A | * | 11/1999 | Cherabuddi et al. | 711/122 |
| 6,081,872 | A | * | 6/2000 | Matick et al. | 711/122 |
| 6,473,835 | B1 | * | 10/2002 | Luick | 711/122 |

OTHER PUBLICATIONS

Motorola, "MC 88410 Secondary Cache Controller User's Manual", 1992, P 2-41 to 2-43.*
Handy, "The Cache Memory Book", 1993, P 250.*

* cited by examiner

*Primary Examiner*—Kevin L. Ellis (57) ABSTRACT

A multi-processor computer architecture reduces processing time and bus bandwidth during snoop processing. The architecture includes processors and local caches. Each local cache corresponds to one of the processors. The architecture includes one or more virtual busses coupled to the local caches and the processors, and one or more intermediary caches, where at least one intermediary cache is coupled to each virtual bus. Each intermediary cache includes a memory array and means for ensuring the intermediary cache is inclusive of associated local caches. The architecture further includes a main memory having a plurality of memory lines accessible by the processors.

20 Claims, 6 Drawing Sheets

METHOD AND MECHANISM TO USE A CACHE TO TRANSLATE FROM A VIRTUAL BUS TO A PHYSICAL BUS

CROSS REFERENCE TO RELATED APPLICATION(s)

This application is a continuation of application Ser. No. 09/733,123, filed Dec. 8, 2000, now U.S. Pat. No. 6,721,848, entitled METHOD AND MECHANISM TO USE A CACHE TO TRANSLATE FROM A VIRTUAL BUS TO A PHYSICAL BUS, which is incorporated herein by reference in its entirety.

TECHNICAL FIELD

The technical field is computer architectures employing caches. In particular, the technical field relates to computer architectures that support snoop processing to maintain coherency among levels of caches.

BACKGROUND

In order to improve the performance of computers having a single central processing unit, computer designers have developed architectures that have many central processing units. Often, the central processing units in such multiprocessing computers are connected to each other and to the computer's main memory over a common bus. However, the number of central processors that can be connected to a common bus is limited by the bandwidth needed to support the central processors and the total bandwidth of the common bus. One approach for reducing the bus bandwidth required by each processor in a multi-processor computer involves placing a cache between each processor and the common bus. A cache is a small, high-speed buffer memory that temporarily holds data and/or instructions from a main memory. Once data is loaded into such a local, or processor associated cache, the processor can access the data in the cache without accessing the common bus. Typically, when a processor obtains data from its cache, less data is transmitted over the limited bandwidth of the common bus.

As a result of, and in addition to reducing common bus bandwidth requirements, the use of a cache shortens the time necessary to access memory, either for data or instruction fetch. The information located in the cache may be accessed in much less time than information located in the main memory. Thus, a processor with a cache needs to spend far less time waiting for instructions and operands to be fetched and/or stored.

A cache is made up of many cache lines of one or more words of data. Each cache line has associated with it an address tag that uniquely identifies the line of main memory from which the cache line is copied. Each time the processor makes a memory reference, an address tag comparison is made to see if a copy of the requested line resides in the cache. If the desired line is not in the cache, a "cache miss" occurs. The memory line is then retrieved from the main memory, stored in the cache as a cache line, and supplied to the processor. In addition to using a cache to retrieve data from main memory, the processor may also write data into the cache instead of directly to the main memory. When the processor desires to write data to the memory, the cache makes an address tag comparison to see if the cache line into which data is to be written resides in the cache. If the cache line exists in the cache and is modified or exclusive, the data is written into the cache line in the cache memory. In many systems a data bit for the cache line is then set. The data bit indicates that data in the cache line has been modified, and thus before the cache line is deleted from the cache, the modified data must be written into main memory. If the cache line into which data is to be written does not exist in the cache memory, the cache/memory line must be fetched into the cache or the data written directly into the main memory.

Modern computer systems also use virtual addressing as a means of sharing physical memory among many different processes. In these computers, local caches use a portion of a virtual address as an index to the local cache (a virtually-indexed cache). This is often done as a performance optimization, allowing cache lookup to start before the virtual address has been converted to a physical address. Such systems may require that the underlying chip-set present a portion of the virtual address to the processor for certain bus transactions. This is because a computing system may allow more than one virtual address to map to the same physical address (a concept called aliasing). In systems with virtually indexed caches, there is often the requirement that all virtual references to the same line must map to the same set.

Other computer systems have buses that only support physical addresses. However, a processor using a virtual address cannot be placed on a physical only bus. Thus some mechanism must be provided to allow translation from a virtual bus to a physical bus.

SUMMARY

What is disclosed is a method for translating from a virtually-addressed bus to a physically-addressed bus, including presenting a virtual address for a memory line on the virtually-addressed bus, initiating snoop processing of an intermediary inclusive storage device coupled to the virtually-addressed bus, the intermediary inclusive device capable of storing information related to the memory line from a main memory coupled to the physically-addressed bus, and storing in the intermediary inclusive storage device a pre-fetched memory line. The pre-fetched memory line includes an address tag and data and a pre-fetched status bit, and the pre-fetch status bit includes an ON and an OFF indication. The method further includes switching the pre-fetch status bit to OFF when the virtual address for the pre-fetched memory line is presented on the virtually addressed bus, receiving one of a snoop hit and a snoop miss, if a snoop hit, initiating further snoop processing on local caches coupled to the virtually-addressed bus, and if a snoop miss, accessing a memory location in the main memory.

Also disclosed is a method for reducing processing time and bus bandwidth during snoop processing of a multi-processor computer architecture, the architecture including higher level caches and intermediary caches. The method includes establishing the intermediary caches as inclusive caches, where an inclusive intermediary cache includes at least all memory lines of corresponding higher level caches, presenting a virtual address for a memory line on a virtually-addressed bus, initiating snoop processing of the intermediary caches, if receiving a snoop hit, initiating snoop processing on the higher level caches, and if receiving a snoop miss, accessing main memory.

Still further is disclosed a multi-processor computer architecture for reducing processing time and bus bandwidth during snoop processing. The architecture includes processors and local caches. Each local cache corresponds to one of the processors. The architecture includes one or more virtual busses coupled to the local caches and the processors, and one or more intermediary caches, where at least one intermediary cache is coupled to each virtual bus. Each intermediary cache includes a memory array and means for ensuring the intermediary cache is inclusive of associated local caches. The architecture further includes a main memory having a plurality of memory lines accessible by the processors.

Yet further is disclosed a mechanism for translating from a virtual bus to a physical interconnect, including a main memory storing memory line, processors coupled to the main memory and capable of accessing the memory lines, and means for reducing processing time and bus bandwidth during snoop processing by the processors.

DESCRIPTION OF THE DRAWINGS

The detailed description will refer to the following drawings in which like numerals refer to like elements, and in which.

DETAILED DESCRIPTION

A large, multi-level cache system can substantially reduce the memory bandwidth demands of a processor. If the memory bandwidth demands are reduced, multiple processors may be able to share the same memory. Thus, multiple processors may share a single physical memory connected by a shared bus. One mechanism for reducing the bandwidth demands is the use of local, or processor associated caches. Such caches may be located on the same chip as the processor.

Caches have been constructed in three principal types: direct-mapped, set-associative, and fully-associative. Details of the three cache types are described in the following prior art references, the contents of which are hereby incorporated by reference: De Blasi, "Computer Architecture," ISBN 0-201-41603-4 (Addison-Wesley, 1990), pp. 273–291; Stone, "High Performance Computer Architecture," ISBN 0-201-51377-3 (Addison-Wesley, 2d Ed. 1990), pp. 29–39; Tabak, "Advanced Microprocessors," ISBN 0-07-062807-6 (McGraw-Hill, 1991) pp. 244–248. These references are well known to those skilled in the art.

Figure 1:
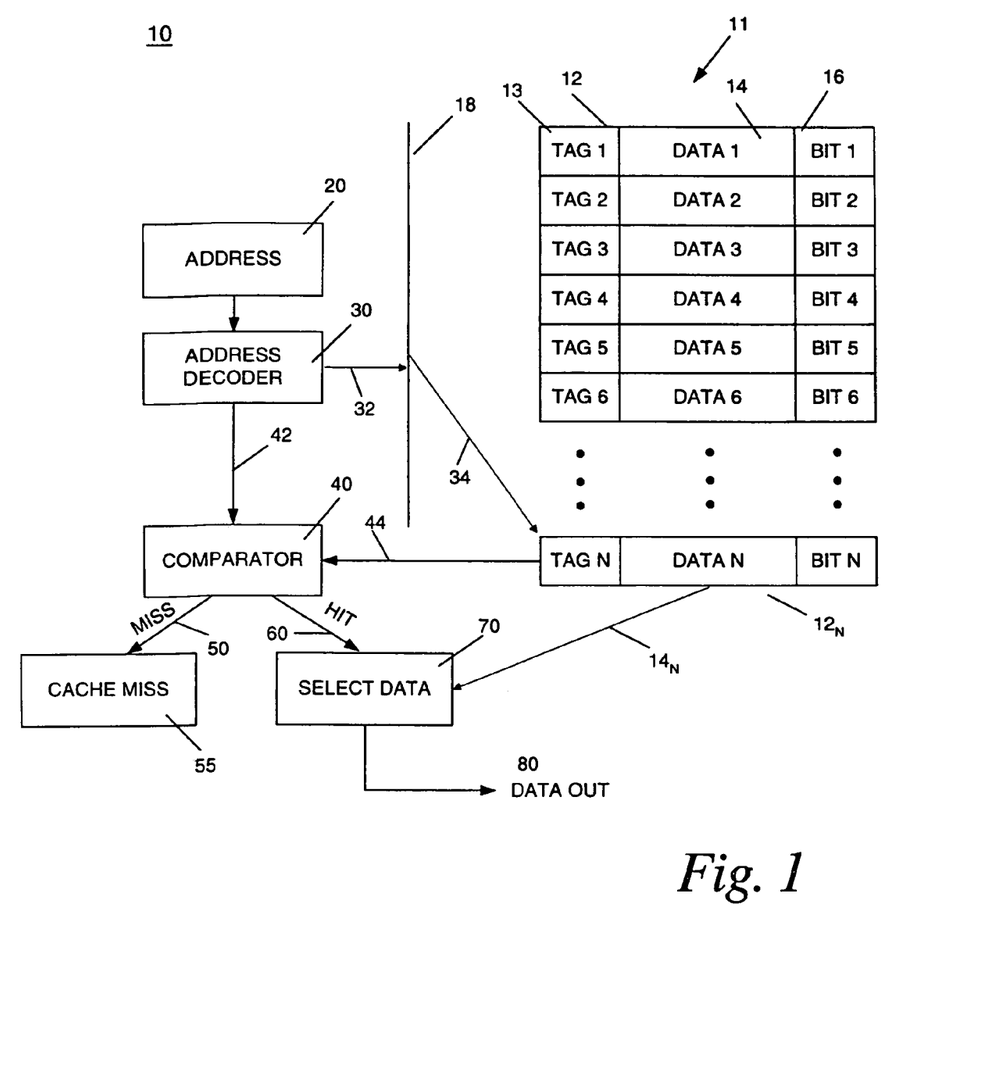
FIG. 1 is a diagram of a cache memory system.

In all three types of caches, an input address is applied to comparison logic. A subset of the address, called tag bits, may be extracted from the input address and compared to tag bits of each cache entry. If the tag bits match, corresponding data is extracted from the cache. The general structure and processing of a direct-mapped cache 10 are shown in FIG. 1. The cache 10 includes an array 11 having many lines 12, with each line 12 including a tag 13 and a data element 14, and bits 16. The function of the bits 16 will be described later. The tags, data elements and bits in each cache line are logically accessed together. An index, or select function 18 is used to select a line out of the array 11. A processor provides an input address 20, which is then fed to an address decoder 30 that separates set selection bits 32 from the input address 20. The set selection bits 32 are used as an input to the select function 18. The address decoder 30 also provides the bits of the address 42 corresponding to the tag for the line 12 to the comparator 40. The comparator 40 also receives a second input 44 that includes tag bits from the array 11 at a location pointed to by address decoder 30 also provides the bits of the address 42 corresponding to the tag for the line 12 to the comparator 40. The set selection bits 32 point 34 to a unique tag in the array 11. In the example shown, a line $12_N$ is selected. If a match is found by the comparator 40, then the comparator 40 asserts a hit output 60, causing a data select circuit 70 to read a data element $14_N$ from the array 11. Since the tags and data elements are arranged in lines, the data select circuit 70 receives the data element corresponding to the matched tag. The selected data (the data bits $14_N$) are fed as output 80 from the cache 10 to the processor for further processing. If no match is found between the first input 42 and the location in the array 11 pointed to by the low order bits of the input address, the comparator 40 asserts a miss output 50. This triggers miss processing 55, which may require accessing main memory.

In general, direct-mapped caches provide fastest access but requires the most time for comparing tag bits. Fully-associative caches provide fast comparison but consume higher power and require more complex circuitry.

Caches can be very efficient at reducing the total bus bandwidth required by a multiple processor system. However, multiple caches may create memory coherency problems. For example, each cache may contains its own copy of a data value. In such situations, if more than one processor can independently modify a data value, then different versions of the same data value could exist in more than one cache. This would result in erroneous operations, consequently, some mechanism must ensure that all the processors have a consistent view of all data values at all times. In particular, when a processor modifies a data value, the modified data value exists in the cache before the modified data value is written back to main memory. Then, until the cache writes the modified data value back to main memory, the main memory and the other caches will contain a stale copy of the data value. In order to maintain data integrity, the other processors that request the data value must obtain the up-to-date version of the data value, not the stale data value.

The process of ensuring that all the processors have a consistent view of all data values is called cache coherency. One method for achieving cache coherency relies on a process called "snooping." Snooping typically requires that all processors and their associated caches share a common bus. Snooping in a cache involves monitoring bus transactions on the common bus. Snooping identifies which transactions affect the contents of a cache or which transactions relate to modified data existing in a cache. Sharing a common bus allows the caches to monitor the bus transactions and potentially interfere with a bus transaction when a particular cache contains a modified data value.

Cache coherency methods also typically use coherency status information, which indicates whether a particular data value in a cache is invalid, modified, shared, or exclusively owned. Two current coherency protocols are the MESI cache coherency protocol and the MOESI cache coherency protocol. The MESI acronym stands for the Modified, Exclusive, Shared and Invalid states while the MOESI acronym stands for the Modified, Owned, Exclusive, Shared and Invalid states. A more simplified protocol may use only the Modified, Shared, and Invalid (MSI) states.

The meanings of the states vary from one implementation to another. Broadly speaking, the modified state usually means that a particular cache has modified a particular data value. The exclusive state and owned state usually means that a particular cache may modify a copy of the data value. The shared state usually means that copies of a data value may exist in different caches. The invalid state means that the data value in a cache is invalid.

With the MESI protocol, if the state (coherency status) of a cache line is Modified, the cache line is valid, the main memory copy is out of date, other copies of the cache line do not exist in other processor caches, and a write to the cache line does not go to the bus. If the state of the cache line is Exclusive, the cache line is valid, the main memory copy is up-to-date, other copies of the cache line do not exist, a write to the line does not go to the bus, and once the line is written to, the line state changes from Exclusive to Modified. If the state of the cache line is Shared, the cache line is valid, the main memory copy is up-to-date, other processor caches may have a copy of the cache line, and a write to the cache line causes the processor to gain exclusive ownership of the line via a bus transaction. If the state of the cache line is Invalid, the cache line is not valid.

In operation, the cache snoops bus operations and uses the coherency status information to ensure cache coherency. In an example, a first processor having a first cache may desire to obtain a particular data value. A second processor having a second cache contains a modified version of the data value (the coherency status information indicates that the data value in the second cache is in the modified state). In this example, the first processor initiates a read bus request to obtain the data value. The second cache snoops the read bus request and determines that the second cache contains the modified version of the data value. The second cache then intervenes and delivers the modified data value to the first processor via the common bus. Depending on the computer architecture, the modified data value may or may not be simultaneously written to the main memory and marked Invalid in the second cache.

Normal cache tags can be used to implement the process of snooping. To track whether a cache block is shared, an extra state bit may be used. Such a bit may be included in a cache line stored in a cache. The bit may be changed as the status of the cache line changes. Returning to FIG. 1, the bits 16 in the cache lines may be used to indicate the coherency status of the cache lines. For example, by adding a bit indicating whether a cache line is shared, the cache can determine whether a write operation must generate a cache line invalidate transaction. When a write to a memory line in the shared state occurs, the cache generates an invalidation transaction on the bus to cause any copies that might be in other caches to be invalidated. No further invalidations will be sent by that processor for that memory line. The processor with the sole copy of a cache line may be referred to as the owner of the cache line.

Every bus transaction requires the cache tags to be interrogated. This checking could potentially interfere with cache accesses. This potential interference may be reduced by duplicating the tags or by employing a multilevel, inclusive cache structure. In such an inclusive structure, cache levels closer to the processor are a subset of caches that are farther away from the processor. Then, every entry in the caches closer to the processor are repeated in caches further away from the processor. This allows the inclusive cache that are further away from the processor to filter out irrelevant snoop requests such that the snoops do not have to be repeated on the local bus.

In some computer systems, the upper level caches are virtually indexed. This means that the processors cannot use the physical address during the address phase to snoop because there may not be a relationship between the virtual address and the physical address bits. Instead, some virtual address bits and some physical address bit may be used. But the virtual address bits are used by other processors to index the cache and to make sure the processors are able to complete the bus snoop. This is required because of the shortcut of not storing physical addresses and waiting on a TLB look-up before the cache indexing is completed.

In the case of a virtually-indexed, virtually tagged cache, the virtual address is used for two reasons: to provide the indexing operation and to provide the virtual tag. In the case of a virtually-indexed, physically tagged cache, the virtual address bits are used to look up the tag, but the tag is compared with bits of the physical address. The snoop phase in these systems would require both physical and virtual addresses.

Figure 2:
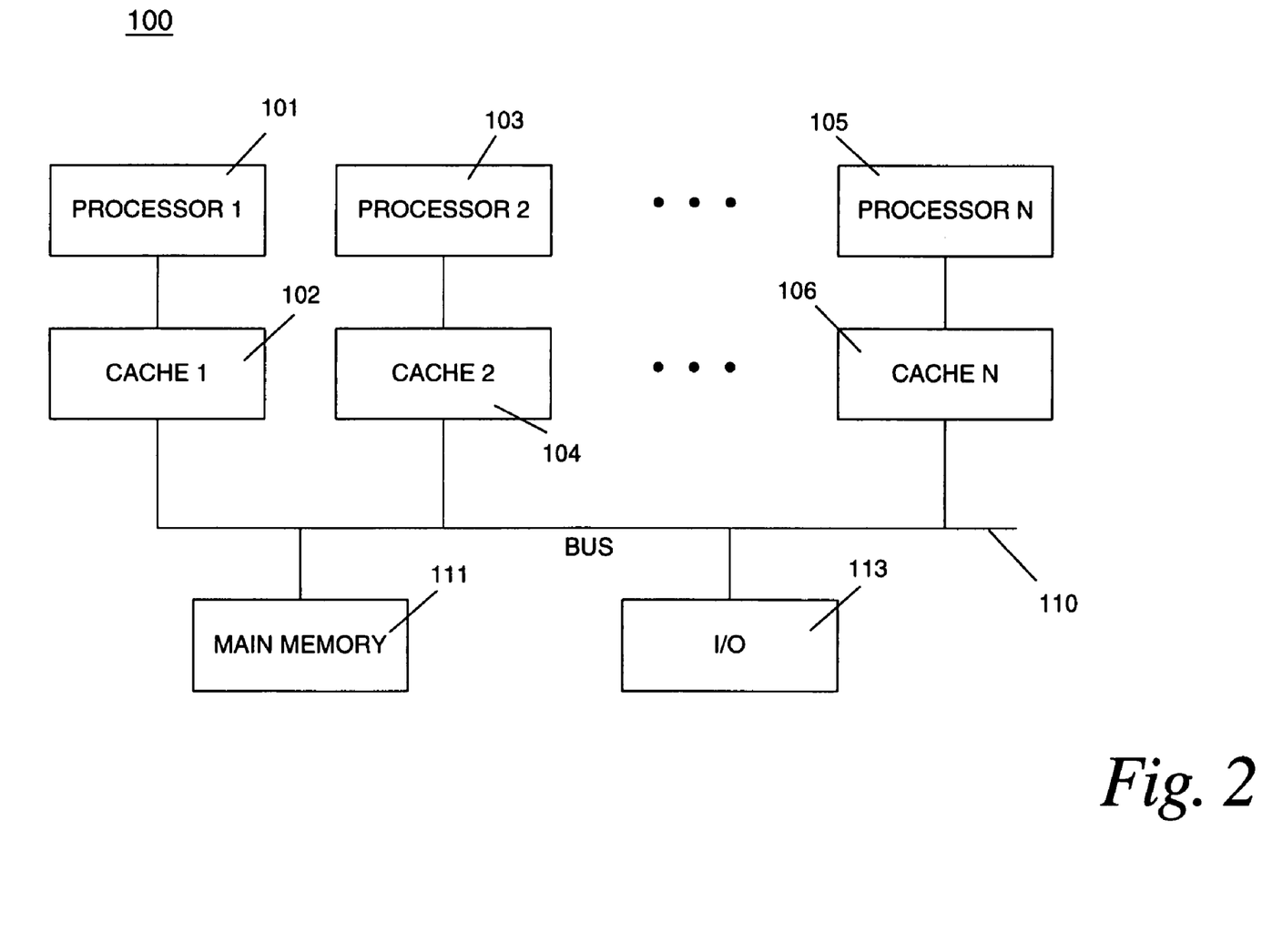
FIG. 2 is a block diagram of a computer architecture that uses a physically-addressed bus.

FIG. 2 is a block diagram of a computer system 100 that uses multiple processors 1-N (labeled as 101, 103 and 105) and associated local caches 102, 104 and 106. The processors 1-N are connected through their caches to a shared bus 110. Also connected to the bus 110 is a main memory 111 and an input/output (I/O) system 113.

In operation, any time one of the processors, such as the processor 101 attempts to acquire data from the main memory 111, all other processors (that is, the processors 103 and 105) snoop the bus 110 to determine what address space the processor 101 is attempting to access. Thus, an address phase on the bus 110 is followed by a snoop phase on the bus 110. If the data are held in any of the caches 104 and 106, then the appropriate cache controller will send a message onto the bus 110, and may, if required, cause the state of the data (i.e., the cache line) to change such that the processor 101 may access the data (the cache line) directly from the cache. That is, instead of the data being provided by the main memory 111, the data are provided by the appropriate cache.

During the address phase described above, the processor 101 may use a virtual address to attempt to access the desired data. However, the memory 111 is a physically-addressed space. Accordingly, a device, such as a translation lookaside buffer (TLB), may be required to translate the virtual address into a physical address. The translation takes time, and to accelerate access to the data, the system 100 may use bits from the virtual address to index into the cache 102. That is, in parallel with translation of virtual address to physical address in the TLB, virtual tag bits from the virtual address are used to select an entry into the cache 102. While this process may improve memory latency, there is no guarantee that a relationship exists between the physical index bits and the virtual index bits. Thus, for the snooping process to occur, both the physical address and the virtual address must be presented on the bus 110. In reality, only some of the virtual index bits may be required to ensure proper snoop phase processing. And this is because the system 100 use the shortcut of not storing the physical addresses while awaiting a TLB look-up before the cache indexing was completed.

Figure 3:
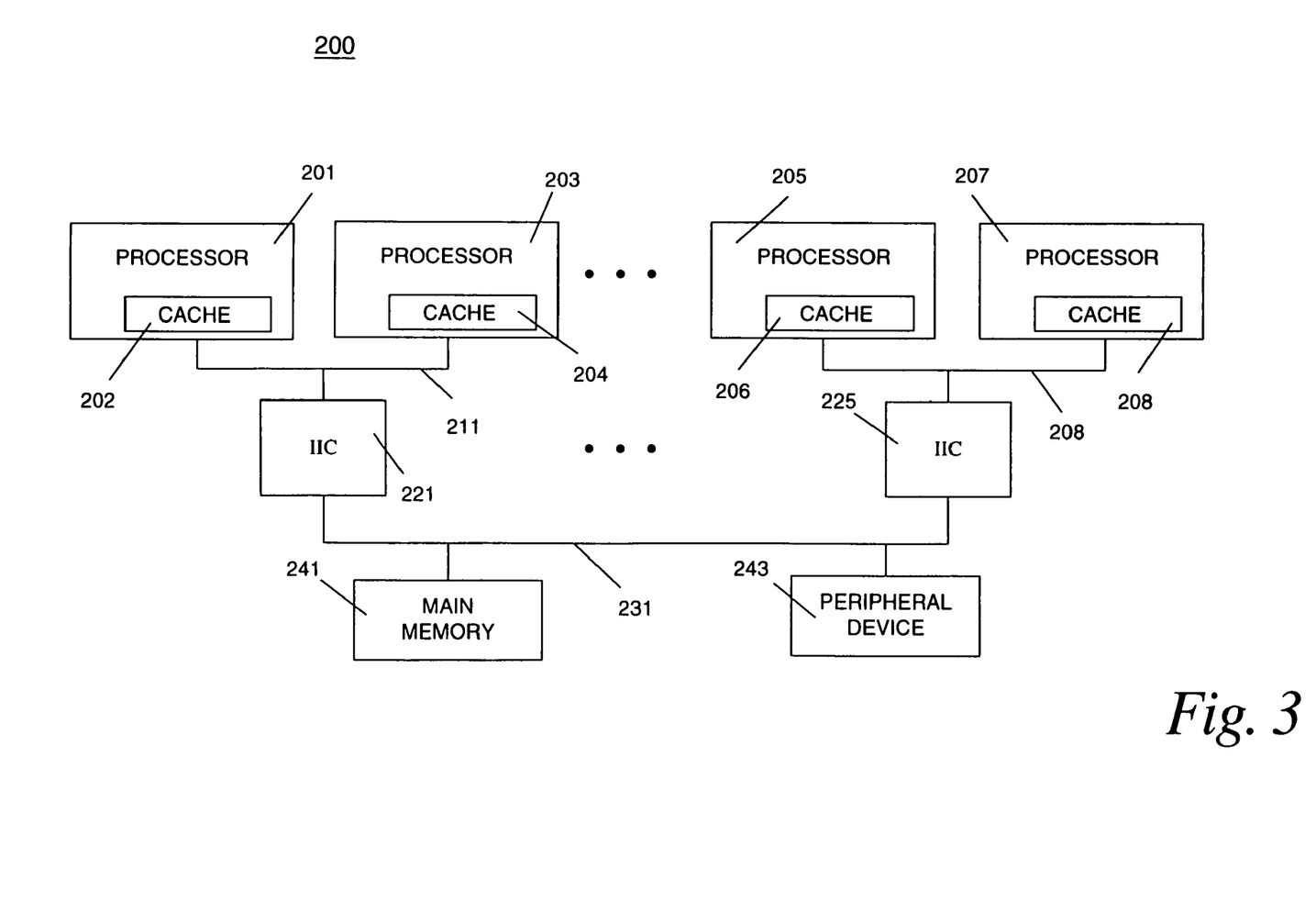
FIG. 3 is a block diagram of an embodiment of a computer architecture that allows use of a cache to translate from a virtual bus to a physical bus.

FIG. 3 is a block diagram of a computer architecture 200 that allows virtually-addressed caches to interface with a physically-addressed bus. The architecture 200 includes several processors. In the example shown, processors 201 and 203 are coupled to virtually-addressed local bus 211, and processors 205 and 207 are coupled to virtually-addressed local bus 215. Each of the processors 201, 203, 205 and 207 includes a local, or high level, cache, as shown (i.e., the caches 202, 204, 206 and 208). The processors 201, 203 and 205,207 are coupled to intermediary inclusive storage devices, which, in the embodiment shown in FIG. 3 are shared caches or intermediate inclusive caches (IICs). In particular, the processors 201 and 203 are coupled to an IIC 221 through the local bus 211. The processors 205 and 207 are coupled to an IIC 225 through the local bus 215. The IICs 221 and 225 are coupled to a physically-addressed interconnect 231. In an embodiment, the interconnect 231 may be a main bus. Also coupled to the main bus 231 are main memory 241 and I/O device 243. In FIG. 3, two processors are coupled to each of the virtual buses. However, the virtual buses may support more than two processors.

The IICs 221 and 225 must be guaranteed by their protocols to contain all the lines that are held by all processors on their local or virtual busses. If a processor, such as the processor 201 on the virtually-addressed local bus 211, wants to read a line out of the main memory 241, the line may be written to the IIC 221 and to an upper level cache. The IIC 221 has to remember which lines have been written to the upper level caches. The IIC 221 must hold a valid virtual address for each line held in an upper level cache if the snoop process is to be completed.

The IICs 221 and 225 keep track of what data and information is going into the other, higher level caches, specifically, which lines are held in the caches 202 and 204, and 206 and 208. The processors 201, 203, 205 and 207 initiate memory requests on the upper, virtual buses using virtual addresses. The virtual addresses used with the memory requests must be translated into a physical address in order to access the main memory 241. A device, such as a translation lookaside buffer (TLB) (not shown) may be used for the address translation. While the TLB completes the address translation, bits form the virtual address are stored in the IICs. Because the architecture 200 includes multiple IICs, and because the interconnect 231 may be accessed by other devices, such as an I/O device, the IICs 221 and 225 must be able to be snooped, and they have to be able to be snooped with physical addresses. However, the local caches 202, 204, 206, and 208 cannot be snooped with just a physical address. Therefore, data and instructions are not cached into the IICs 221 and 225 until one of the processors 201, 203, 205 and 207 asks for the data or instructions in the form of a memory request. That is, the IICs 221 and 225 only cache data that the processors 201, 203, 205 and 207 have requested. When the processors 201, 203, 205 and 207 ask for the data using a virtual address, the virtual address is "remembered" by storing bits from the virtual address in the IICs 221 and 225. When a such a transaction is initiated by one of the processors 201, 203, 205 and 207, anyone of the other processors may snoop that line starting with the appropriate IIC. If a snoop hit occurs, further snooping, on the upper bus, may be required to ensure the most up-to-date copy of the data (memory line) is provided.

In an embodiment, an IIC must be guaranteed by its protocol to contain all lines that are held by all processors on the virtual buses. For example, the IIC 221 must be guaranteed to contain all lines stored in either of the caches 202 and 204. Similarly, the IIC 225 must be guaranteed to contain all the lines that are stored in the caches 206 and 208. Thus, anytime the processor 201, for example, reads a line from the main memory 241, the line is stored not only in the cache 202, but also in the IIC 221.

One way to ensure the IICs always include at least all the lines stored in the upper level caches is to make the capacity of the IIC at least that of the total capacity of the upper level caches. Alternatively, a protocol may be implemented such that if a line must ever be evicted from the IIC, the line is also evicted from any upper level cache that also holds that line. This inclusive feature then allows more efficient snoop processing because only the IIC may need to be snooped to determine if data or an instruction from the main memory is cached. For example, if a snoop operation returns a miss, the snooping processor/cache is guaranteed that the information is not stored in one of the upper level caches. In the case of a snoop hit, a further snoop operation may be required to determine the cache that holds the information. Eliminating unnecessary snooping reduces processing time and bus bandwidth. By making the IIC inclusive, the upper busses are protected from unnecessary bus traffic.

In FIG. 3, the intermediary inclusive storage devices are implemented as shared caches. In an alternative embodiment, the devices may be implemented as coherency filters. A coherency filter is simply a data-less cache. That is, the coherency filter stores, or caches, virtual address bits, but not the data or instructions related to a virtual address. Whenever a processor makes a memory request, the coherency filter ensures that the tag associated with the information is entered into the coherency filter's memory structure. Also entered is the identity of the processor that owns the line, and the line's associated coherency protocol. Any request for data from the coherency filter results in a miss. A snoop request will indicate whether an upper level cache has the information, because the coherency filter is inclusive. In this case, the snoop request will then cause the upper level cache to be snooped.

As an example, assume that the processor 201 has stored in its cache 202, a copy of lines 37, 38 and 39 from the main memory 241, and that the state of line 37 is Shared, the state of line 38 is Modified, and the state of line 39 is Shared. A request from another agent (e.g., the processor 203) connected to the interconnect 231 is for line 37 for a read. The IIC 211 then indicates that line 37 is Shared, and that will cause cache 203 to get line 37 in the Shared state from the main memory 241. The processor 203 does not have to snoop the cache 202 because the cache 202 already has the line 37 in the Shared state and the cache 202 does not have to change the state of the line 37.

Line 38 is held in the cache 202 and has a state of Modified. If the processor 203 wants to read the line 38, the IIC 211 will show the line 38 as Modified and will issue a back invalidate transaction that causes the processor 201 to give up its modified version of line 38 and to write the line 38 back to the interconnect 231, from which the line 38 is then provided to the processor 203. The line is also invalidate out of the IIC 211, but may then be stored in the IIC 211 as Shared.

Line 39 is stored in the cache 202 in the Shared state, and in an example, the processor 203 wants to write line 39 back to the main memory 241. In other words, the processor 203 wants to obtain exclusive ownership of the line 39 for the purpose of writing. The processor 203 issues a write request out to the bus 210, and snoop operations indicate that the line 39 is Shared. But in this case, the cache 202 must also be snooped because the processor 203 wants to write to line 39. To avoid retaining a copy of a line that is being modified (by the write operation), line 39 is invalidated from the cache 202 and from the IIC 211. Line 39 is then read from the main memory 241 and is temporarily stored in the cache 202 in a Modified state.

As more and more processors and caches are added to the computer architecture, more time is spent with snoop requests, and less time spent actually accessing data and instructions from the main memory. Unless the coherency filter or a IIC is included in the computer architecture, the number of snoop requests may overwhelm the system.

Figure 4:
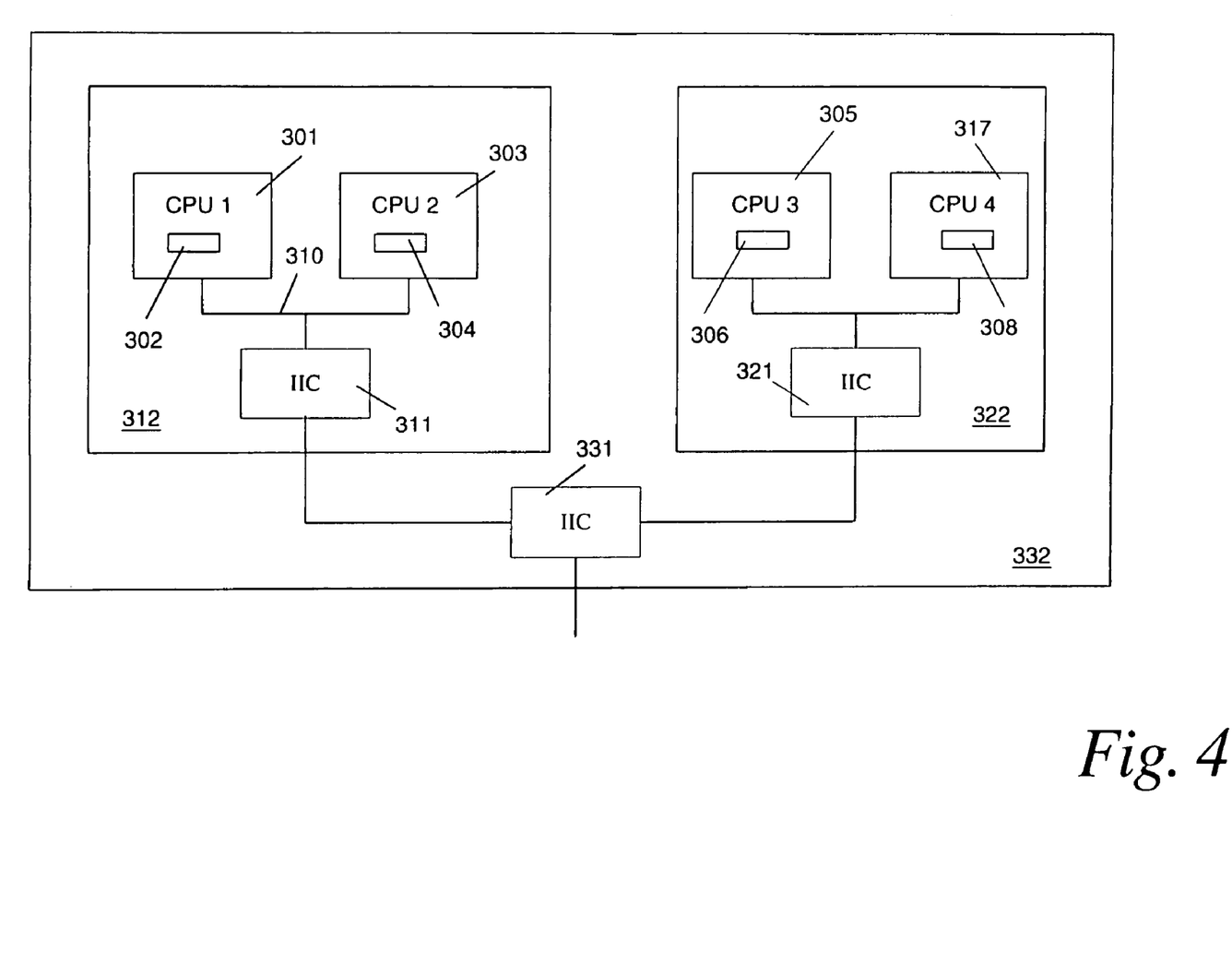
FIGS. 4 and 5 are block diagrams of alternative computer architectures that use a shared cache to translate between virtually addressed components and physically addressed components.

FIG. 3 illustrates an embodiment in which a single layer of intermediary inclusive caches are included in the computer architecture. In another embodiment, multiple layers or hierarchies of intermediary inclusive caches may be used. Such an architecture 300 is shown in FIG. 4. A CPU 301, with an on-chip cache 302 is coupled through a virtually-addressed bus 310 to a CPU 303 and cache 304. Also coupled to the bus 310 is an IIC 311. The combination 312 of CPUs 301, 303, caches 302, 304, bus 310 and IIC 311 appears as simply another CPU with an on-chip cache. As such, the combination 312 may be nested with a corresponding combination 322 and coupled to an IIC 331 to form another combination 332 that has the appearance and function of a CPU with an on-chip cache. This process of layering CPUs and IICs may continue for many hierarchical layers.

Figure 5:
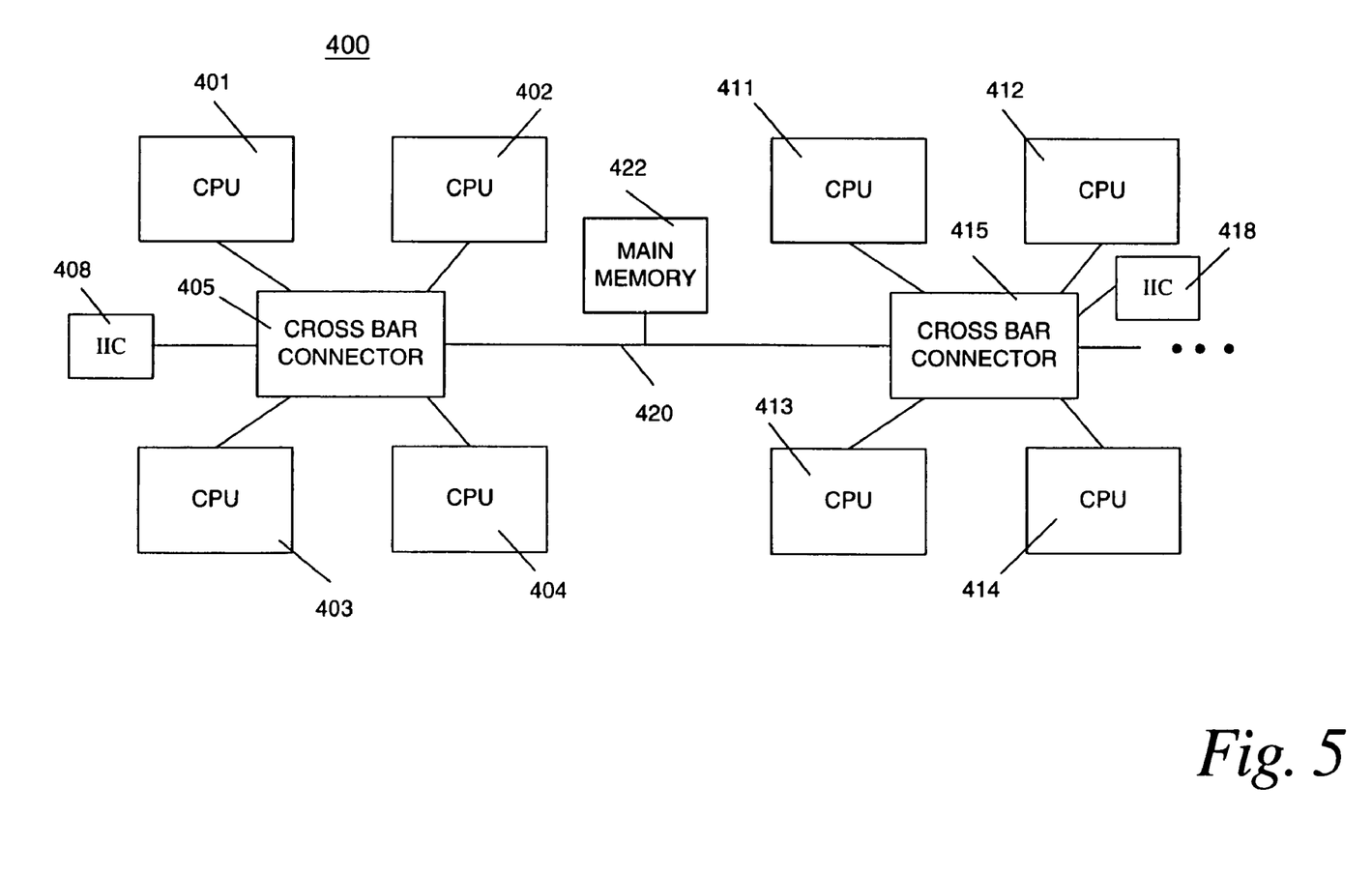

Returning to FIG. 3, the architecture 200 is shown with a physically-addressed bus as a common interconnect. However, the architecture 200 need not be limited to the use of a bus as a device interconnect. FIG. 5 illustrates an alternative embodiment for interconnecting CPUs and shared caches. An architecture 400 includes CPUs 401–404 coupled to a cross-bar connection 405. Also coupled to the cross-bar connection 405 in an IIC 408. Each of the CPUs 401–404 includes an on-chip cache that is virtually-indexed. CPUs 411–414 are coupled to a cross-bar connection 415. Also coupled to the cross-bar connection 415 is an IIC 418. The cross connects 405 and 415 are coupled to a bridge 420. Also coupled to the bridge 420 is a main memory 422. The bridge 420 may be physically-addressed, and may include connections to other devices such as I/O devices, for example.

In operation of the system 400, the IICs 408 and 418 function in the same manner as the IICs shown in FIG. 3. That is, the IICs 408 and 418 translate between a virtually-addressed interface (the cross-connects 405 and 415) and the bridge 420. The IICs 408 and 418 are also used to prevent irrelevant snooping of the on-chip caches associated with the CPUs 401–404 and 411–414.

Other architectures may also be used with the IICs. For example, a point-to-point architecture may also use the IICs.

Returning to FIG. 3, in the embodiment shown, the IICs 221 and 225 hold lines only when one of the processors 201, 203, 205 and 207 initiates a memory request. In an alternative embodiment, the IICs 221 and 225 may be controlled so as to pre-fetching. In this embodiment, a pre-fetch status bit may be added to the bits 16 of a line (see FIG. 1) to indicate that the line is pre-fetched and is not held in any of the upper caches (the caches 202, 204, 206 and 208). When the line is then stored in one of the IICs 221 or 225, the pre-fetch status bit may be flipped ON. However, the line does not include the virtual bits provided by the processor because the line has not yet been requested by the processor. The bit ON would then have the following semantics: if a snoop occurs in the architecture 200 and a snoop hit occurs, no further snooping is required because no upper level cache holds the line. If the line is subsequently stored in one of the upper level caches, the pre-fetch status bit is flipped OFF, the virtual bits are stored with the line, and snoop processing occurs as previously described. That is, to flip the pre-fetch status bit from ON to OFF, the IIC must be presented with a virtual address for the line.

Figure 6:
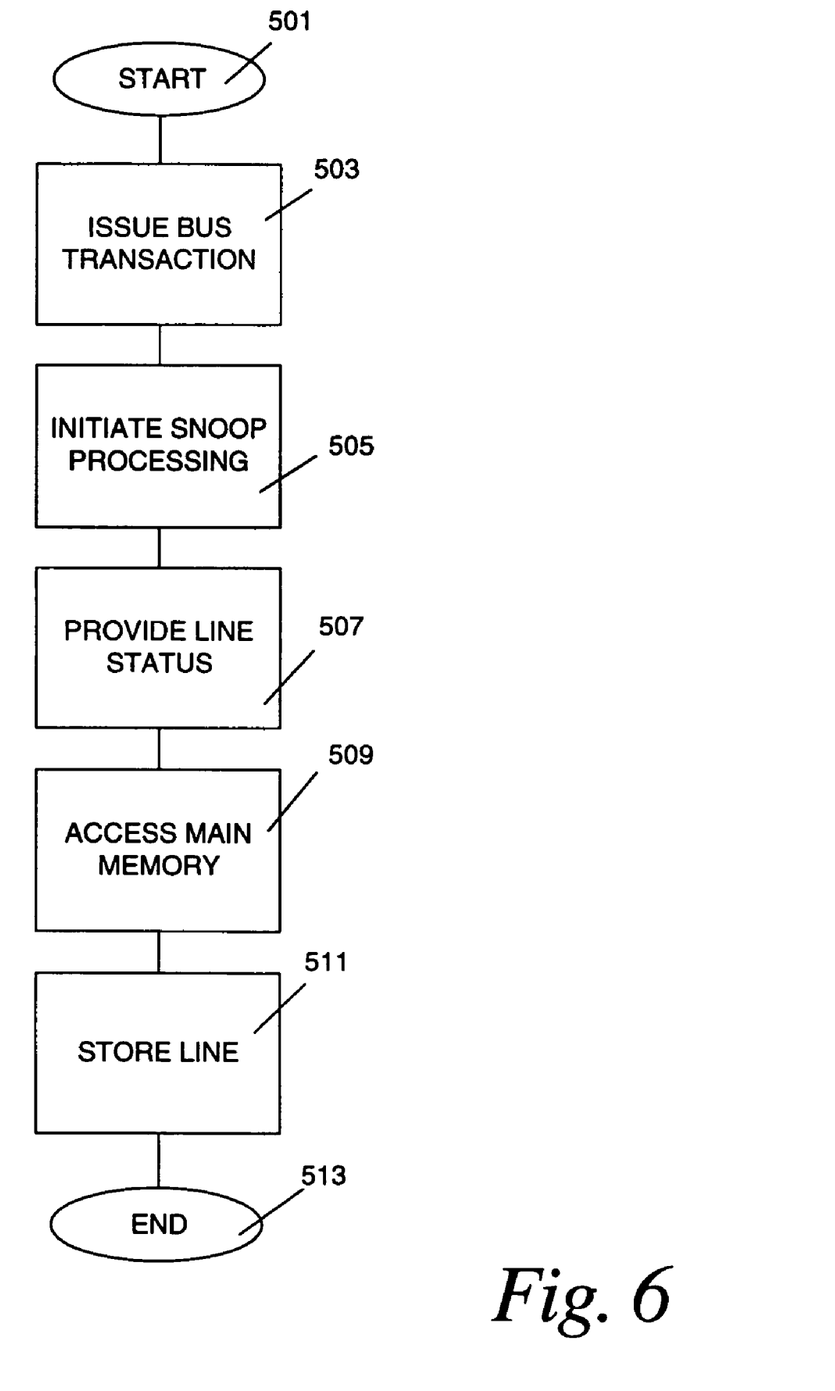
FIG. 6 is a flow chart illustrating an operation of the computer architecture of FIG. 3.

FIG. 6 is a flowchart illustrating an operation 500 of the architecture 200 of FIG. 3. In an example, the cache 202 holds lines 37 38 and 39 from the main memory 241, and the state of line 37 is Shared, the state of line 38 is Modified, and the state of line 39 is Shared. The process begins with block 501. In block 503, the processor 205 issues a bus transaction on the bus 211 for the memory line 37. When issuing the bus transaction, the processor 205 provides a virtual address for the memory line 37. In block 505, the other processors of the architecture snoop the IIC 221. Because the processor 201 had previously requested the memory line 37, the memory line is stored in the IIC 221, and has a state of Shared indicated. The IIC 221 provides an indication that the memory 37 is stored in the IIC 221, and that its state is Shared, block 507. The processor 205 then retrieves the memory line from the main memory 241, block 509. The memory line is then stored in the cache 206 and the IIC 225, block 511. The process then moves to block 513 and ends.

The terms and descriptions used herein are set forth by way of illustration only and are not meant as limitations. Those skilled in the art will recognize that many variations are possible within the scope of the invention as defined in the following claims, and their equivalents, in which all terms are to be understood in their broadest possible sense unless otherwise indicated.

The invention claimed is:

1. A method for translating from a virtually-addressed bus to a physically-addressed bus, comprising:
   presenting a virtual address for a memory line on the virtually-addressed bus;
   initiating snoop processing of an intermediary inclusive storage device coupled to the virtually-addressed bus, the intermediary inclusive device capable of storing information related to the memory line from a main memory coupled to the physically-addressed bus;
   storing in the intermediary inclusive storage device a pre-fetched memory line including an address tag and data and a pre-fetched status bit, wherein the pre-fetch status bit includes an ON and an OFF indication;
   switching the pre-fetch status bit to OFF when the virtual address for the pre-fetched memory line is presented on the virtually addressed bus;
   receiving one of a snoop hit and a snoop miss;
   if a snoop hit, initiating further snoop processing on local caches coupled to the virtually-addressed bus; and
   if a snoop miss, accessing a memory location in the main memory.

2. The method of claim 1, wherein when a snoop hit occurs, further comprising reading a coherency bit associated with the memory line, and wherein the status of the coherency bit determines a processes for supplying the memory line in accordance with the presented virtual address.

3. The method of claim 1, wherein memory lines are stored in an intermediary inclusive cache.

4. The method of claim 1, wherein address tags are stored in a coherency filter.

5. A method for reducing processing time and bus bandwidth during snoop processing of a multi-processor computer architecture, the architecture comprising higher level caches and intermediary caches, the intermediary caches implemented as coherency filters, the intermediary caches implemented as coherency filters, the method, comprising:
   establishing the intermediary caches as inclusive caches, wherein an inclusive intermediary cache includes at least all memory lines of corresponding higher level caches;

presenting a virtual address for a memory line on a virtually-addressed bus, comprising:
  entering a tag associated with the memory line into a memory structure of a coherency filter,
  entering an identity of a processor that owns the memory line, and
  entering a coherency protocol of the memory line;
initiating snoop processing of the intermediary caches;
if receiving a snoop hit, initiating snoop processing on the higher level caches; and
if receiving a snoop miss, accessing main memory.

6. The method of claim 5, wherein establishing the intermediary caches as inclusive caches comprises making a capacity of the intermediary caches exceed a total capacity of the corresponding higher level caches.

7. The method of claim 5, wherein establishing the intermediary caches as inclusive caches comprises evicting from any upper level cache a memory line evicted from a corresponding intermediary cache.

8. A multi-processor computer architecture for reducing processing time and bus bandwidth during snoop processing, comprising:
  a plurality of processors;
  a plurality of local caches, each local cache corresponding to one of the processors;
  one or more virtual busses coupled to the local caches and the processors;
  one or more intermediary caches, wherein at least one intermediary cache is coupled to each virtual bus, each intermediary cache comprising:
    a memory array, and
    means for ensuring the intermediary cache is inclusive of associated local caches; and
  a main memory having a plurality of memory lines accessible by the processors.

9. The architecture of claim 8, wherein the ensuring means comprises a capacity of the intermediary cache equal to or greater than a combined capacity of the associated local caches.

10. The architecture of claim 8, wherein the ensuring means comprises a
  protocol that evicts from any local cache, a memory line evicted from a corresponding intermediary cache.

11. The architecture of claim 8, wherein the memory array is structured to store one or more pre-fetch memory lines, each pre-fetch memory line including: an address tag;
virtual address bits; and
a pre-fetch status bit, wherein the pre-fetch status bit indicates when a virtual address for the pre-fetch memory line is presented on a virtual bus.

12. The architecture of claim 8, wherein one of the intermediary caches is a coherency filter.

13. The architecture of claim 8, wherein one of the intermediary caches is a shared cache.

14. The architecture of claim 8, further comprising a hierarchy of local caches and intermediary caches.

15. The architecture of claim 8, further comprising a physical interconnect coupled to each of the intermediary caches.

16. The architecture of claim 15, wherein the physical interconnect is a cross-bar connection.

17. The architecture of claim 15, wherein the physical interconnect is a point-to-point link.

18. A mechanism for translating from a virtual bus to a physical interconnect, comprising:
  a main memory storing memory lines;
  processors coupled to the main memory and capable of accessing the memory lines; and
  means for reducing processing time and bus bandwidth during snoop processing by the processors, wherein the reducing means comprises one or more inclusive cache means coupled to the physical interconnect and to virtual buses, the virtual buses coupled to the processors, wherein the reducing means comprises one or more inclusive cache means coupled to the physical interconnect and to virtual buses, the virtual buses coupled to the processors.

19. The mechanism of claim 18, wherein the inclusive cache means comprises a capacity of an intermediary cache equal to or greater than a combined capacity of associated local caches.

20. The mechanism of claim 18, wherein the inclusive cache means comprises a protocol that evicts from any local cache, a memory line evicted from a corresponding intermediary cache.

* * * * *

UNITED STATES PATENT AND TRADEMARK OFFICE
CERTIFICATE OF CORRECTION

PATENT NO. : 7,032,074 B2
APPLICATION NO. : 10/814154
DATED : April 18, 2006
INVENTOR(S) : Blaine Douglas Gaither It is certified that error appears in the above-identified patent and that said Letters Patent is hereby corrected as shown below:

On the title page, in item (73), in "Assignee", in column 1, line 2, after "Company" insert -- , --.

In column 10, lines 61-62, in Claim 5, after "caches," delete "the intermediary caches implemented as coherency filters,".

In column 11, line 2, in Claim 5, after "bus" delete ",".

Signed and Sealed this

Nineteenth Day of May, 2009

JOHN DOLL
*Acting Director of the United States Patent and Trademark Office*